(12) United States Patent
Zhang et al.

(10) Patent No.: US 10,270,499 B2
(45) Date of Patent: Apr. 23, 2019

(54) DATA TRANSMISSION METHOD AND DEVICE

(71) Applicant: Huawei Technologies Co., Ltd., Shenzhen (CN)

(72) Inventors: Leiming Zhang, Beijing (CN); Kunpeng Liu, Beijing (CN); Yongxing Zhou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/727,889

(22) Filed: Oct. 9, 2017

(65) Prior Publication Data
US 2018/0034516 A1 Feb. 1, 2018

Related U.S. Application Data

(63) Continuation of application No. PCT/CN2015/076282, filed on Apr. 10, 2015.

(51) Int. Cl.
| | |
|---|---|
| *H04B 7/0413* | (2017.01) |
| *H04B 7/04* | (2017.01) |
| *H04L 1/06* | (2006.01) |
| *H04B 7/06* | (2006.01) |
| *H04W 4/02* | (2018.01) |

(52) U.S. Cl.
CPC .......... *H04B 7/0413* (2013.01); *H04B 7/04* (2013.01); *H04B 7/0617* (2013.01); *H04L 1/06* (2013.01); *H04W 4/02* (2013.01)

(58) Field of Classification Search
CPC ...... H04B 7/0413; H04B 7/0617; H04W 4/02
See application file for complete search history.

(56) References Cited

U.S. PATENT DOCUMENTS

| | | | | |
|---|---|---|---|---|
| 5,852,630 A | * | 12/1998 | Langberg ............ | H04L 27/2647 375/219 |
| 9,379,796 B2 | * | 6/2016 | Maru ................... | H04B 7/04 |
| 9,525,476 B2 | * | 12/2016 | Kang ................... | H01Q 3/06 |

(Continued)

FOREIGN PATENT DOCUMENTS

| | | |
|---|---|---|
| CN | 101009534 A | 8/2007 |
| CN | 102437872 A | 5/2012 |
| WO | 2015016487 A1 | 2/2015 |

OTHER PUBLICATIONS

Yang, Jingya,"Antenna Optimization Method of the LoS MIMO Channel in High Speed Railway Scenarios," Beijing Jiaotong University, Apr. 2013, 76 pages.

*Primary Examiner* — Kenneth T Lam
(74) *Attorney, Agent, or Firm* — Slater Matsil, LLP

(57) ABSTRACT

The present invention provides a data transmission method and device. The method includes: performing, by the first communications equipment, multi-stream data transmission with the second communications equipment according to a first antenna port, where the first antenna port is an antenna port, of the first communications equipment, satisfying a condition for multi-stream data transmission between the first communications equipment and the second communications equipment. The method provided in embodiments of the present invention improves applicability of a multi-stream data transmission system for line of sight propagation.

20 Claims, 7 Drawing Sheets

(56) References Cited

U.S. PATENT DOCUMENTS

| | | | | |
|---|---|---|---|---|
| 2008/0026697 A1* | 1/2008 | Signell | ................... | H01Q 1/246 455/66.1 |
| 2010/0067362 A1* | 3/2010 | Sakaguchi | .......... | H04L 25/0206 370/203 |
| 2012/0162012 A1* | 6/2012 | Marzouki | ................. | G01S 3/72 342/378 |
| 2013/0177102 A1* | 7/2013 | Park | .................... | H04B 7/0639 375/295 |
| 2013/0258964 A1* | 10/2013 | Nam | ................... | H04W 72/046 370/329 |
| 2014/0093005 A1* | 4/2014 | Xia | ...................... | H04B 7/0617 375/267 |
| 2014/0348255 A1* | 11/2014 | Lorca Hernando | .. | H04B 7/0452 375/267 |
| 2014/0355706 A1* | 12/2014 | Zhou | .................... | H04B 7/0413 375/267 |
| 2015/0372398 A1* | 12/2015 | Dudorov | .............. | H01Q 25/008 342/368 |
| 2016/0344463 A1* | 11/2016 | Kim | ..................... | H04B 7/0456 |
| 2018/0054294 A1* | 2/2018 | Rappaport | ............ | H04L 7/0033 |

* cited by examiner

First communications equipment obtains a first antenna port corresponding to location information of second communications equipment, where the first antenna port is an antenna port, of the first communications equipment, satisfying a condition for multi-stream data transmission between the first communications equipment and the second communications equipment, the location information includes a line of sight transmission distance between the first communications equipment and the second communications equipment and/or information about a relative angle between the first communications equipment and the second communications equipment  ⟶ S101

The first communications equipment performs multi-stream data transmission with the second communications equipment according to the first antenna port  ⟶ S102

FIG. 6

First communications equipment obtains location information of second communications equipment  ⟶ S201

The first communications equipment obtains a first antenna port according to the location information of the second communications equipment and a mapping relationship between the location information of the second communications equipment and the first antenna port  ⟶ S202

FIG. 7

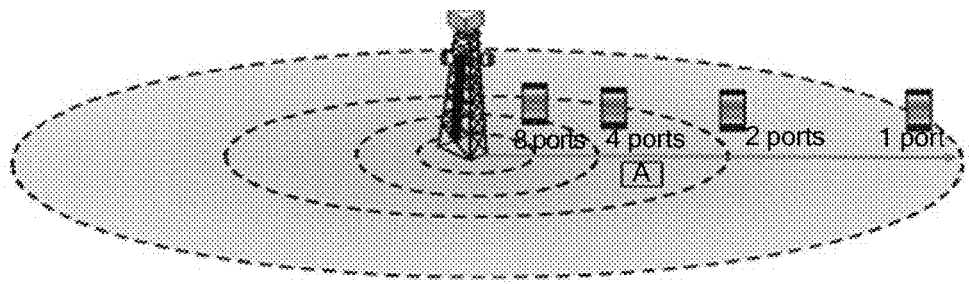

FIG. 8

| First communications equipment receives antenna port information reported by second communications equipment according to location information of the second communications equipment, where the antenna port information includes a quantity of first antenna ports and/or a sequence number of a first antenna port | S301 |

| The first communications equipment determines the first antenna port according to the antenna port information | S302 |

FIG. 9

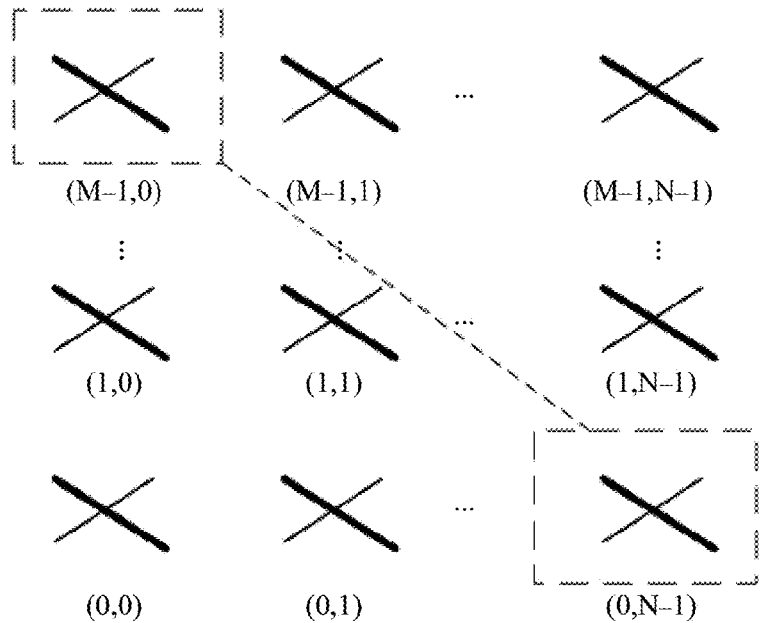

FIG. 10

Second communications equipment selects, according to location information of the second communications equipment, a first antenna port corresponding to the location information of the second communications equipment, where the first antenna port is an antenna port, of first communications equipment, satisfying a condition for multi-stream data transmission between the first communications equipment and the second communications equipment, and the location information of the second communications equipment includes a line of sight transmission distance between the first communications equipment and the second communications equipment and/or information about a relative angle between the first communications equipment and the second communications equipment ⁓ S401

The second communications equipment performs multi-stream transmission with the first communications equipment according to the first antenna port ⁓ S402

FIG. 11

DATA TRANSMISSION METHOD AND DEVICE

CROSS-REFERENCE TO RELATED APPLICATIONS

This application is a continuation of International Application No. PCT/CN2015/076282, filed on Apr. 10, 2015, the disclosure of which is hereby incorporated by reference in its entirety.

TECHNICAL FIELD

The present invention relates to the communications technologies, and in particular, to a data transmission method and device.

BACKGROUND

In a multiple input multiple output (MIMO for short below) communications system, a multiplexing gain can be obtained by means of signal processing. The multiplexing gain is a capacity gain obtained when multi-stream signals are simultaneously transmitted in the MIMO communications system by using a same time-frequency resource. A value of the multiplexing gain is related to a channel rank. The multiplexing gain that can be obtained by means of signal processing increases with the rank. A channel rank is related to a signal propagation environment. If there are a wider variety of phenomena such as scattering and refraction in the propagation environment, a larger quantity of multipath components arrive at a receive end, and a channel rank corresponding to the multipath components is larger. However, when line of sight (LOS for short) propagation is performed between a base station and user equipment, that is, when there is a direct path between the base station and the user equipment, power of a signal from the direct path is far higher than power of a signal obtained from another path, and there is a relatively large correlation between subchannels. Therefore, a channel rank is relatively low, which is usually 1, that is, transmission of only one data stream signal is supported. As a result, a system throughput is limited.

In the prior art, a correlation between subchannels in a direct path scenario is reduced by increasing a transmission distance between two antennas at a transmit end, so that a base station and user equipment can perform multi-stream transmission with each other in the direct path scenario, to improve a system throughput. Specifically, as shown in FIG. 1, assuming that two antennas at a transmit end are t1 and t2, respectively, two antennas at a receive end are r1 and r2, respectively, a transmission distance D is a horizontal distance between the transmit end and the receive end, a distance between t1 and t2 is dt, and a distance between r1 and r2 is dr. In the prior art, D is increased to generate distance differences between t1 and r2 and between t2 and r2, so as to generate a phase difference between signals on the two paths. Therefore, r2 can distinguish between the signals on the two paths. According to this method, the receive end can distinguish between data streams on different paths, so that the transmit end and the receive end can perform multi-stream transmission in the direct path scenario.

However, in the prior art, when the transmit end and the receive end perform multi-stream transmission in the direct path scenario, locations of the transmit end and the receive end are constant. Consequently, the prior art cannot support multi-stream data transmission of a mobile user (a mobile receive end) performed in a direct path scenario, and has low applicability.

SUMMARY

Embodiments of the present invention provide a data transmission method and device, to resolve a technical problem that the prior art cannot support multi-stream data transmission performed between mobile user equipment and a base station in a direct path scenario.

According to a first aspect, an embodiment of the present invention provides a data transmission device comprising a processor and a memory storing a program to be executed in the processor. The program comprises instructions for obtaining a first antenna port corresponding to location information of a second communications equipment. The first antenna port is an antenna port, of a first communications equipment, satisfying a condition for multi-stream data transmission between the first communications equipment and the second communications equipment, and the location information of the second communications equipment comprises a line of sight transmission distance between the first communications equipment and the second communications equipment and/or information about a relative angle between the first communications equipment and the second communications equipment. The data transmission device is the first communications equipment and the second communications equipment is a mobile communications equipment. A transceiver is configured to perform multi-stream data transmission with the second communications equipment according to the first antenna port.

With reference to the first aspect, in a first possible implementation of the first aspect, the obtaining module is specifically configured to obtain the location information of the second communications equipment, and obtain the first antenna port according to the location information of the second communications equipment and a mapping relationship between the location information of the second communications equipment and the first antenna port.

With reference to the first possible implementation of the first aspect, in a second possible implementation of the first aspect, that the obtaining module is specifically configured to obtain the location information of the second communications equipment includes: the obtaining module is specifically configured to receive, by using the transceiver module, the location information of the second communications equipment that is reported by the second communications equipment.

With reference to the first aspect, in a third possible implementation of the first aspect, the transceiver module is further configured to receive antenna port information reported by the second communications equipment according to the location information of the second communications equipment, where the antenna port information includes a quantity of first antenna ports and/or a sequence number of the first antenna port; and the obtaining module is specifically configured to determine the first antenna port according to the antenna port information obtained by the transceiver module.

With reference to the third possible implementation of the first aspect, in a fourth possible implementation of the first aspect, a mapping relationship between the location information of the second communications equipment and the first antenna port is preset on both the first communications equipment and the second communications equipment, or a mapping relationship between the location information of the second communications equipment and the first antenna port is preset on the second communications equipment, and the antenna port information is determined by the second communications equipment according to the location information of the second communications equipment and the mapping relationship.

With reference to the third possible implementation of the first aspect, in a fifth possible implementation of the first aspect, that the transceiver module is further configured to receive antenna port information reported by the second communications equipment according to the location information of the second communications equipment specifically includes: the transceiver module is further configured to send a reference signal to the second communications equipment according to the location information of the second communications equipment, and receive the antenna port information reported by the second communications equipment, where the reference signal is used to instruct the second communications equipment to obtain channel state information according to the reference signal and select the first antenna port according to the channel state information.

With reference to the third possible implementation of the first aspect, in a sixth possible implementation of the first aspect, the antenna port information is determined by the second communications equipment according to the location information of the second communications equipment and a distance between second antenna ports of the second communications equipment.

According to a second aspect, an embodiment of the present invention provides a data transmission device, where the data transmission device is applicable to a multi-stream data transmission system for line of sight propagation, the data transmission device is second communications equipment, the system includes first communications equipment and the second communications equipment, both the first communications equipment and the second communications equipment include multiple antenna ports, and the second communications equipment is mobile communications equipment; and the data transmission device includes: a processing module, configured to select, according to location information of the second communications equipment, a first antenna port corresponding to the location information of the second communications equipment, where the first antenna port is an antenna port, of the first communications equipment, satisfying a condition for multi-stream data transmission between the first communications equipment and the second communications equipment, and the location information of the second communications equipment includes a line of sight transmission distance between the first communications equipment and the second communications equipment and/or information about a relative angle between the first communications equipment and the second communications equipment; and a transceiver module, configured to perform multi-stream transmission with the first communications equipment according to the first antenna port.

With reference to the second aspect, in a first possible implementation of the second aspect, a mapping relationship between the location information of the second communications equipment and the first antenna port is preset on both the first communications equipment and the second communications equipment; and the processing module is specifically configured to select the first antenna port according to the location information of the second communications equipment and the mapping relationship between the location information of the second communications equipment and the first antenna port.

With reference to the first possible implementation of the second aspect, in a second possible implementation of the second aspect, the transceiver module is further configured to report the location information of the second communications equipment to the first communications equipment before the processing module selects, according to the location information of the second communications equipment and the mapping relationship between the location information of the second communications equipment and the first antenna port, the first antenna port corresponding to the location information of the second communications equipment, so that the first communications equipment obtains the first antenna port according to the location information of the second communications equipment and the mapping relationship.

With reference to the second aspect or the first possible implementation of the second aspect, in a third possible implementation of the second aspect, the transceiver module is further configured to send antenna port information to the first communications equipment after the processing module selects, according to the location information of the second communications equipment and the mapping relationship between the location information of the second communications equipment and the first antenna port, the first antenna port corresponding to the location information of the second communications equipment, where the antenna port information includes a quantity of first antenna ports and/or a sequence number of the first antenna port, and the antenna port information is used to instruct the first communications equipment to determine the first antenna port.

With reference to the second aspect, in a fourth possible implementation of the second aspect, the transceiver module is further configured to receive a reference signal delivered by the first communications equipment according to the location information of the second communications equipment; and the processing module is specifically configured to determine channel state information according to the reference signal, and select the first antenna port according to the channel state information.

With reference to the second aspect, in a fifth possible implementation of the second aspect, the processing module is specifically configured to: determine a first distance according to the location information of the second communications equipment and a distance between the antenna ports of the second communications equipment; and select, from the antenna ports of the first communications equipment according to the first distance, the first antenna ports satisfying the first distance, where the first distance is a distance that antenna ports of the first communications equipment need to satisfy and at which the first communications equipment is able to perform multi-stream transmission with the second communications equipment.

With reference to the fourth possible implementation of the second aspect or the fifth possible implementation of the second aspect, in a sixth possible implementation of the second aspect, the transceiver module is further configured to send antenna port information to the first communications equipment after the processing module selects, according to the location information of the second communications equipment, the first antenna port corresponding to the location information of the second communications equipment, where the antenna port information includes a quantity of first antenna ports and/or a sequence number of the first antenna port, and the antenna port information is used to enable the first communications equipment to determine the first antenna port.

According to a third aspect, an embodiment of the present invention provides a data transmission device, where the data transmission device is applicable to a multi-stream data transmission system for line of sight propagation, the data transmission device is first communications equipment, the system includes the first communications equipment and second communications equipment, both the first communications equipment and the second communications equipment include multiple antenna ports, and the second communications equipment is mobile communications equipment; and the data transmission device includes: a processor, configured to obtain a first antenna port corresponding to location information of the second communications equipment, where the first antenna port is an antenna port, of the first communications equipment, satisfying a condition for multi-stream data transmission between the first communications equipment and the second communications equipment, and the location information of the second communications equipment includes a line of sight transmission distance between the first communications equipment and the second communications equipment and/or information about a relative angle between the first communications equipment and the second communications equipment; and a transceiver, configured to perform multi-stream data transmission with the second communications equipment according to the first antenna port.

With reference to the third aspect, in a first possible implementation of the third aspect, the processor is specifically configured to obtain the location information of the second communications equipment, and obtain the first antenna port according to the location information of the second communications equipment and a mapping relationship between the location information of the second communications equipment and the first antenna port.

With reference to the first possible implementation of the third aspect, in a second possible implementation of the third aspect, that the processor is specifically configured to obtain the location information of the second communications equipment includes: the processor is specifically configured to receive, by using the transceiver, the location information of the second communications equipment that is reported by the second communications equipment.

With reference to the third aspect, in a third possible implementation of the third aspect, the transceiver is further configured to receive antenna port information reported by the second communications equipment according to the location information of the second communications equipment, where the antenna port information includes a quantity of first antenna ports and/or a sequence number of the first antenna port; and the processor is specifically configured to determine the first antenna port according to the antenna port information obtained by the transceiver.

With reference to the third possible implementation of the third aspect, in a fourth possible implementation of the third aspect, a mapping relationship between the location information of the second communications equipment and the first antenna port is preset on both the first communications equipment and the second communications equipment, or a mapping relationship between the location information of the second communications equipment and the first antenna port is preset on the second communications equipment, and the antenna port information is determined by the second communications equipment according to the location information of the second communications equipment and the mapping relationship.

With reference to the third possible implementation of the third aspect, in a fifth possible implementation of the third aspect, that the transceiver is further configured to receive antenna port information reported by the second communications equipment according to the location information of the second communications equipment specifically includes: the transceiver is further configured to send a reference signal to the second communications equipment according to the location information of the second communications equipment, and receive the antenna port information reported by the second communications equipment, where the reference signal is used to instruct the second communications equipment to obtain channel state information according to the reference signal and select the first antenna port according to the channel state information.

With reference to the third possible implementation of the third aspect, in a sixth possible implementation of the third aspect, the antenna port information is determined by the second communications equipment according to the location information of the second communications equipment and a distance between second antenna ports of the second communications equipment.

According to a fourth aspect, an embodiment of the present invention provides a data transmission device, where the data transmission device is applicable to a multi-stream data transmission system for line of sight propagation, the data transmission device is second communications equipment, the system includes first communications equipment and the second communications equipment, both the first communications equipment and the second communications equipment include multiple antenna ports, and the second communications equipment is mobile communications equipment; and the data transmission device includes: a processor, configured to select, according to location information of the second communications equipment, a first antenna port corresponding to the location information of the second communications equipment, where the first antenna port is an antenna port, of the first communications equipment, satisfying a condition for multi-stream data transmission between the first communications equipment and the second communications equipment, and the location information of the second communications equipment includes a line of sight transmission distance between the first communications equipment and the second communications equipment and/or information about a relative angle between the first communications equipment and the second communications equipment; and a transceiver, configured to perform multi-stream transmission with the first communications equipment according to the first antenna port.

With reference to the fourth aspect, in a first possible implementation of the fourth aspect, a mapping relationship between the location information of the second communications equipment and the first antenna port is preset on both the first communications equipment and the second communications equipment; and the processor is specifically configured to select the first antenna port according to the location information of the second communications equipment and the mapping relationship between the location information of the second communications equipment and the first antenna port.

With reference to the first possible implementation of the fourth aspect, in a second possible implementation of the fourth aspect, the transceiver is further configured to report the location information of the second communications equipment to the first communications equipment before the processor selects, according to the location information of the second communications equipment and the mapping relationship between the location information of the second communications equipment and the first antenna port, the first antenna port corresponding to the location information of the second communications equipment, so that the first communications equipment obtains the first antenna port according to the location information of the second communications equipment and the mapping relationship.

With reference to the fourth aspect or the first possible implementation of the fourth aspect, in a third possible implementation of the fourth aspect, the transceiver is further configured to send antenna port information to the first communications equipment after the processor selects, according to the location information of the second communications equipment and the mapping relationship between the location information of the second communications equipment and the first antenna port, the first antenna port corresponding to the location information of the second communications equipment, where the antenna port information includes a quantity of first antenna ports and/or a sequence number of the first antenna port, and the antenna port information is used to instruct the first communications equipment to determine the first antenna port.

With reference to the fourth aspect, in a fourth possible implementation of the fourth aspect, the transceiver is further configured to receive a reference signal delivered by the first communications equipment according to the location information of the second communications equipment; and the processor is specifically configured to determine channel state information according to the reference signal, and select the first antenna port according to the channel state information.

With reference to the fourth aspect, in a fifth possible implementation of the fourth aspect, the processor is specifically configured to: determine a first distance according to the location information of the second communications equipment and a distance between the antenna ports of the second communications equipment; and select, from the antenna ports of the first communications equipment according to the first distance, the first antenna ports satisfying the first distance, where the first distance is a distance that antenna ports of the first communications equipment need to satisfy and at which the first communications equipment is able to perform multi-stream transmission with the second communications equipment.

With reference to the fourth possible implementation of the fourth aspect or the fifth possible implementation of the fourth aspect, in a sixth possible implementation of the fourth aspect, the transceiver is further configured to send antenna port information to the first communications equipment after the processor selects, according to the location information of the second communications equipment, the first antenna port corresponding to the location information of the second communications equipment, where the antenna port information includes a quantity of first antenna ports and/or a sequence number of the first antenna port, and the antenna port information is used to enable the first communications equipment to determine the first antenna port.

According to a fifth aspect, an embodiment of the present invention provides a data transmission method, where the method is applicable to a multi-stream data transmission system for line of sight propagation, the system includes first communications equipment and second communications equipment, both the first communications equipment and the second communications equipment include multiple antenna ports, and the second communications equipment is mobile communications equipment; and the method includes: obtaining, by the first communications equipment, a first antenna port corresponding to location information of the second communications equipment, where the first antenna port is an antenna port, of the first communications equipment, satisfying a condition for multi-stream data transmission between the first communications equipment and the second communications equipment, and the location information of the second communications equipment includes a line of sight transmission distance between the first communications equipment and the second communications equipment and/or information about a relative angle between the first communications equipment and the second communications equipment; and performing, by the first communications equipment, multi-stream data transmission with the second communications equipment according to the first antenna port.

With reference to the fifth aspect, in a first possible implementation of the fifth aspect, the obtaining, by the first communications equipment, a first antenna port corresponding to location information of the second communications equipment includes: obtaining, by the first communications equipment, the location information of the second communications equipment; and obtaining, by the first communications equipment, the first antenna port according to the location information of the second communications equipment and a mapping relationship between the location information of the second communications equipment and the first antenna port.

With reference to the first possible implementation of the fifth aspect, in a second possible implementation of the fifth aspect, the obtaining, by the first communications equipment, the location information of the second communications equipment includes: receiving, by the first communications equipment, the location information of the second communications equipment that is reported by the second communications equipment.

With reference to the fifth aspect, in a third possible implementation of the fifth aspect, the obtaining, by the first communications equipment, a first antenna port corresponding to location information of the second communications equipment includes: receiving, by the first communications equipment, antenna port information reported by the second communications equipment according to the location information of the second communications equipment, where the antenna port information includes a quantity of first antenna ports and/or a sequence number of the first antenna port; and determining, by the first communications equipment, the first antenna port according to the antenna port information.

With reference to the third possible implementation of the fifth aspect, in a fourth possible implementation of the fifth aspect, a mapping relationship between the location information of the second communications equipment and the first antenna port is preset on both the first communications equipment and the second communications equipment, or a mapping relationship between the location information of the second communications equipment and the first antenna port is preset on the second communications equipment, and the antenna port information is determined by the second communications equipment according to the location information of the second communications equipment and the mapping relationship.

With reference to the third possible implementation of the fifth aspect, in a fifth possible implementation of the fifth aspect, the receiving, by the first communications equipment, antenna port information reported by the second communications equipment according to the location information includes: sending, by the first communications equipment, a reference signal to the second communications equipment according to the location information of the second communications equipment, where the reference signal is used to instruct the second communications equipment to obtain channel state information according to the reference signal and select the first antenna port according to the channel state information; and receiving, by the first communications equipment, the antenna port information reported by the second communications equipment.

With reference to the third possible implementation of the fifth aspect, in a sixth possible implementation of the fifth aspect, the antenna port information is determined by the second communications equipment according to the location information of the second communications equipment and a distance between second antenna ports of the second communications equipment.

According to a sixth aspect, an embodiment of the present invention provides a data transmission method, where the method is applicable to a multi-stream data transmission system for line of sight propagation, the system includes first communications equipment and second communications equipment, both the first communications equipment and the second communications equipment include multiple antenna ports, and the second communications equipment is mobile communications equipment; and the method includes: selecting, by the second communications equipment according to location information of the second communications equipment, a first antenna port corresponding to the location information of the second communications equipment, where the first antenna port is an antenna port, of the first communications equipment, satisfying a condition for multi-stream data transmission between the first communications equipment and the second communications equipment, and the location information of the second communications equipment includes a line of sight transmission distance between the first communications equipment and the second communications equipment and/or information about a relative angle between the first communications equipment and the second communications equipment; and performing, by the second communications equipment, multi-stream transmission with the first communications equipment according to the first antenna port.

With reference to the sixth aspect, in a first possible implementation of the sixth aspect, a mapping relationship between the location information of the second communications equipment and the first antenna port is preset on both the first communications equipment and the second communications equipment; and the selecting, by the second communications equipment according to location information of the second communications equipment, a first antenna port corresponding to the location information of the second communications equipment includes: selecting, by the second communications equipment, the first antenna port according to the location information of the second communications equipment and the mapping relationship between the location information of the second communications equipment and the first antenna port.

With reference to the first possible implementation of the sixth aspect, in a second possible implementation of the sixth aspect, before the selecting, by the second communications equipment according to the location information of the second communications equipment and the mapping relationship between the location information of the second communications equipment and the first antenna port, the first antenna port corresponding to the location information of the second communications equipment, the method further includes: reporting, by the second communications equipment, the location information of the second communications equipment to the first communications equipment, so that the first communications equipment obtains the first antenna port according to the location information of the second communications equipment and the mapping relationship.

With reference to the sixth aspect or the first possible implementation of the sixth aspect, in a third possible implementation of the sixth aspect, before the selecting, by the second communications equipment according to the location information of the second communications equipment and the mapping relationship between the location information of the second communications equipment and the first antenna port, the first antenna port corresponding to the location information of the second communications equipment, the method further includes: sending, by the second communications equipment, antenna port information to the first communications equipment, where the antenna port information includes a quantity of first antenna ports and/or a sequence number of the first antenna port, and the antenna port information is used to instruct the first communications equipment to determine the first antenna port.

With reference to the sixth aspect, in a fourth possible implementation of the sixth aspect, the selecting, by the second communications equipment according to location information of the second communications equipment, a first antenna port corresponding to the location information of the second communications equipment includes: receiving, by the second communications equipment, a reference signal delivered by the first communications equipment according to the location information of the second communications equipment; determining, by the second communications equipment, channel state information according to the reference signal; and selecting, by the second communications equipment, the first antenna port according to the channel state information.

With reference to the sixth aspect, in a fifth possible implementation of the sixth aspect, the selecting, by the second communications equipment according to location information of the second communications equipment, a first antenna port corresponding to the location information of the second communications equipment includes: determining, by the second communications equipment, a first distance according to the location information of the second communications equipment and a distance between the antenna ports of the second communications equipment, where the first distance is a distance that antenna ports of the first communications equipment need to satisfy and at which the first communications equipment is able to perform multi-stream transmission with the second communications equipment; and selecting, by the second communications equipment from the antenna ports of the first communications equipment according to the first distance, the first antenna ports satisfying the first distance.

With reference to the fourth possible implementation of the sixth aspect or the fifth possible implementation of the sixth aspect, in a sixth possible implementation of the sixth aspect, after the selecting, by the second communications equipment according to location information of the second communications equipment, a first antenna port corresponding to the location information of the second communications equipment, the method further includes: sending, by the second communications equipment, antenna port information to the first communications equipment, where the antenna port information includes a quantity of first antenna ports and/or a sequence number of the first antenna port, and the antenna port information is used to enable the first communications equipment to determine the first antenna port.

According to the data transmission method and device in the embodiments of the present invention, first communications equipment obtains a first antenna port corresponding to location information of the second communications equipment and performs multi-stream data transmission with the second communications equipment according to the first antenna port. The method provided in the embodiments of the present invention can support multi-stream data transmission between a base station and mobile user equipment and improve applicability of a multi-stream data transmission system for line of sight propagation.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

FIG. 6 is a schematic flowchart of Embodiment 1 of a data transmission method according to the present invention;

FIG. 7 is a schematic flowchart of Embodiment 2 of a data transmission method according to the present invention;

FIG. 8 is a schematic diagram 1 of antenna port selection according to the present invention;

FIG. 9 is a schematic flowchart of Embodiment 3 of a data transmission method according to the present invention;

FIG. 10 is a schematic diagram 2 of antenna port selection according to the present invention;

FIG. 11 is a schematic flowchart of Embodiment 4 of a data transmission method according to the present invention;

DETAILED DESCRIPTION OF ILLUSTRATIVE EMBODIMENTS

Figure 1:
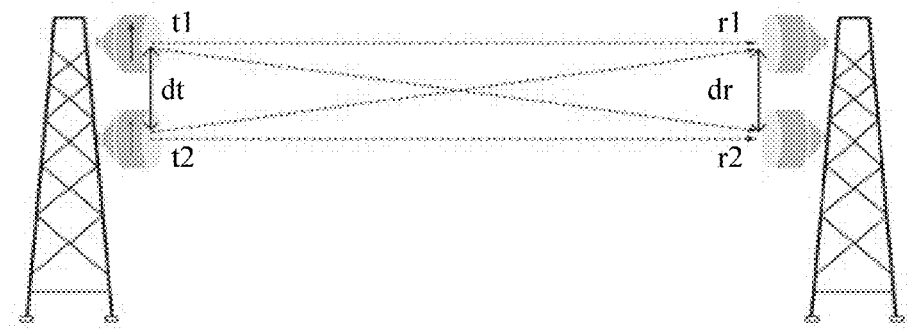
FIG. 1 is a schematic architecture diagram of multi-stream transmission performed between a transmit end and a receive end in a direct path scenario according to the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

A method and a data transmission device in the embodiments of the present invention are applicable to a multi-stream data transmission system for line of sight propagation in a MIMO transmission system, that is, a direct-path data transmission system. The system may include first communications equipment and second communications equipment. Both the first communications equipment and the second communications equipment include multiple antenna ports. The first communications equipment may be a base station. The second communications equipment is mobile communications equipment.

A base station in this application may be a device that communicates with a wireless terminal in an access network over an air interface by using one or more sectors. The base station may be configured to perform mutual conversion between a received over-the-air frame and an IP packet and serve as a router between the wireless terminal and the rest portion of the access network, where the rest portion of the access network may include an Internet Protocol (IP) network. The base station may further coordinate attribute management of the air interface. For example, the base station may be a base transceiver station (BTS, Base Transceiver Station) in GSM or CDMA, may be a NodeB (NodeB) in WCDMA, or may be an evolved NodeB (eNB, or e-NodeB, evolutional Node B) in LTE. This is not limited in this application.

The second communications equipment (that is, the mobile communications equipment) in this application may be a wireless terminal or a wired terminal. The wireless terminal includes a device that provides a user with voice and/or data connectivity. Optionally, the device may be a handheld device with a wireless connection function, or another processing device connected to a wireless modem. In addition, the wireless terminal may also communicate with one or more core networks through a radio access network (for example, RAN). For example, the wireless terminal may be specifically a mobile terminal, such as a mobile phone (also referred to as a "cellular" phone) and a computer with a mobile terminal, and the computer with a mobile terminal may be a portable, pocket-sized, handheld, computer built-in, or in-vehicle mobile apparatus, which can exchange voice and/or data with the core network.

The method and the data transmission device provided in the embodiments of the present invention can resolve a technical problem that the prior art cannot support multi-stream data transmission performed between mobile user equipment and a base station in a direct path scenario.

The following describes technical solutions of the present invention in detail by using specific embodiments. The following several specific embodiments may be mutually combined, and same or similar concepts or processes may not be repeatedly described in some embodiments.

Figure 2:
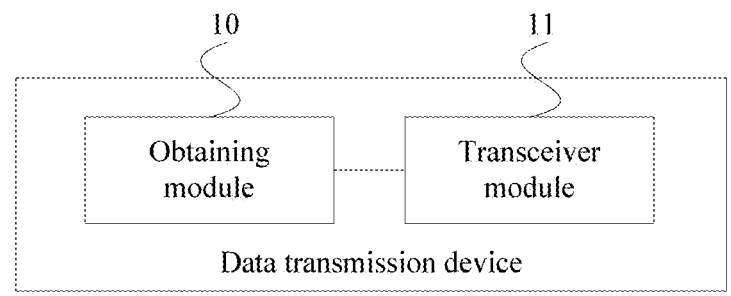
FIG. 2 is a schematic structural diagram of Embodiment 1 of a data transmission device according to the present invention.

FIG. 2 is a schematic structural diagram of Embodiment 1 of a data transmission device according to the present invention. The data transmission device is applicable to a multi-stream data transmission system for line of sight propagation, and the data transmission device may be first communications equipment in the following method embodiment. The multi-stream data transmission system may include the first communications equipment and second communications equipment. Both the first communications equipment and the second communications equipment include multiple antenna ports. The second communications equipment is mobile communications equipment. Referring to FIG. 2, the data transmission device includes an obtaining module 10 and a transceiver module 11.

The obtaining module 10 is configured to obtain a first antenna port corresponding to location information of the second communications equipment. The first antenna port is an antenna port, of the first communications equipment, satisfying a condition for multi-stream data transmission between the first communications equipment and the second communications equipment. The location information of the second communications equipment includes a line of sight transmission distance between the first communications equipment and the second communications equipment and/or information about a relative angle between the first communications equipment and the second communications equipment.

The transceiver module 11 is configured to perform multi-stream data transmission with the second communications equipment according to the first antenna port.

In a possible implementation of this embodiment of the present invention, the obtaining module 10 is specifically configured to obtain the location information of the second communications equipment, and obtain the first antenna port according to the location information of the second communications equipment and a mapping relationship between the location information of the second communications equipment and the first antenna port.

Further, that the obtaining module 10 is specifically configured to obtain the location information of the second communications equipment includes: The obtaining module 10 is specifically configured to receive, by using the transceiver module 11, the location information of the second communications equipment that is reported by the second communications equipment.

In another possible implementation of this embodiment of the present invention, the transceiver module 11 is further configured to receive antenna port information reported by the second communications equipment according to the location information of the second communications equipment. The antenna port information includes a quantity of first antenna ports and/or a sequence number of the first antenna port. The obtaining module 10 is specifically configured to determine the first antenna port according to the antenna port information obtained by the transceiver module 11.

Optionally, if a mapping relationship between the location information of the second communications equipment and the first antenna port is preset on both the first communications equipment and the second communications equipment, or a mapping relationship between the location information of the second communications equipment and the first antenna port is preset on the second communications equipment, the antenna port information may be determined by the second communications equipment according to the location information of the second communications equipment and the mapping relationship.

Optionally, that the transceiver module 11 is further configured to receive antenna port information reported by the second communications equipment according to the location information of the second communications equipment specifically includes: The transceiver module 11 is further configured to send a reference signal to the second communications equipment according to the location information of the second communications equipment, and receive the antenna port information reported by the second communications equipment. The reference signal is used to instruct the second communications equipment to obtain channel state information according to the reference signal and select the first antenna port according to the channel state information.

Optionally, the antenna port information is determined by the second communications equipment according to the location information of the second communications equipment and a distance between second antenna ports of the second communications equipment.

The data transmission device provided in this embodiment of the present invention may implement the following method Embodiment 1 to Embodiment 3. An implementation principle and a technical effect of the data transmission device are similar to those of the following method Embodiment 1 to Embodiment 3. For details, refer to specific processes in the following method Embodiment 1 to Embodiment 3.

Figure 3:
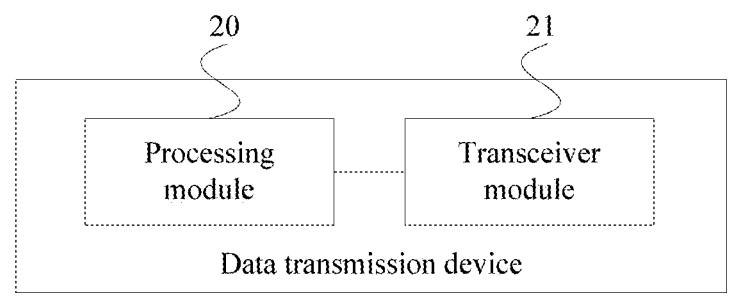
FIG. 3 is a schematic structural diagram of Embodiment 2 of a data transmission device according to the present invention.

FIG. 3 is a schematic structural diagram of Embodiment 2 of a data transmission device according to the present invention. The data transmission device is applicable to a multi-stream data transmission system for line of sight propagation, and the data transmission device may be second communications equipment in the following method embodiment. The multi-stream data transmission system may include first communications equipment and the second communications equipment. Both the first communications equipment and the second communications equipment include multiple antenna ports. The second communications equipment is mobile communications equipment. Referring to FIG. 3, the data transmission device includes a processing module 20 and a transceiver module 21.

The processing module 20 is configured to select, according to location information of the second communications equipment, a first antenna port corresponding to the location information of the second communications equipment. The first antenna port is an antenna port, of the first communications equipment, satisfying a condition for multi-stream data transmission between the first communications equipment and the second communications equipment. The location information of the second communications equipment includes a line of sight transmission distance between the first communications equipment and the second communications equipment and/or information about a relative angle between the first communications equipment and the second communications equipment.

The transceiver module 21 is configured to perform multi-stream transmission with the first communications equipment according to the first antenna port.

In a possible implementation of this embodiment of the present invention, if a mapping relationship between the location information of the second communications equipment and the first antenna port is preset on both the first communications equipment and the second communications equipment, the processing module 20 is specifically configured to select the first antenna port according to the location information of the second communications equipment and the mapping relationship between the location information of the second communications equipment and the first antenna port.

Further, the transceiver module 21 is further configured to report the location information of the second communications equipment to the first communications equipment before the processing module 20 selects, according to the location information of the second communications equipment and the mapping relationship between the location information of the second communications equipment and the first antenna port, the first antenna port corresponding to the location information of the second communications equipment, so that the first communications equipment obtains the first antenna port according to the location information of the second communications equipment and the mapping relationship.

In another possible implementation of this embodiment of the present invention, the transceiver module 21 is further configured to send antenna port information to the first communications equipment after the processing module 20 selects, according to the location information of the second communications equipment and the mapping relationship between the location information of the second communications equipment and the first antenna port, the first antenna port corresponding to the location information of the second communications equipment. The antenna port information includes a quantity of first antenna ports and/or a sequence number of the first antenna port. The antenna port information is used to instruct the first communications equipment to determine the first antenna port.

In a third possible implementation of this embodiment of the present invention, the transceiver module 21 is further configured to receive a reference signal delivered by the first communications equipment according to the location information of the second communications equipment.

The processing module 20 is specifically configured to determine channel state information according to the reference signal, and select the first antenna port according to the channel state information.

In a fourth possible implementation of this embodiment of the present invention, the processing module 20 is specifically configured to: determine a first distance according to the location information of the second communications equipment and a distance between the antenna ports of the second communications equipment; and select, from the antenna ports of the first communications equipment according to the first distance, the first antenna ports satisfying the first distance. The first distance is a distance that antenna ports of the first communications equipment need to satisfy and at which the first communications equipment is able to perform multi-stream transmission with the second communications equipment.

Further, based on the third possible implementation or the fourth possible implementation, the transceiver module 21 is further configured to send antenna port information to the first communications equipment after the processing module 20 selects, according to the location information of the second communications equipment, the first antenna port corresponding to the location information of the second communications equipment. The antenna port information includes a quantity of first antenna ports and/or a sequence number of the first antenna port. The antenna port information is used to enable the first communications equipment to determine the first antenna port.

The data transmission device provided in this embodiment of the present invention may implement the following method Embodiment 4 to Embodiment 6. An implementation principle and a technical effect of the data transmission device are similar to those of the following method Embodiment 4 to Embodiment 6. For details, refer to specific processes in the following method Embodiment 4 to Embodiment 6.

Figure 4:
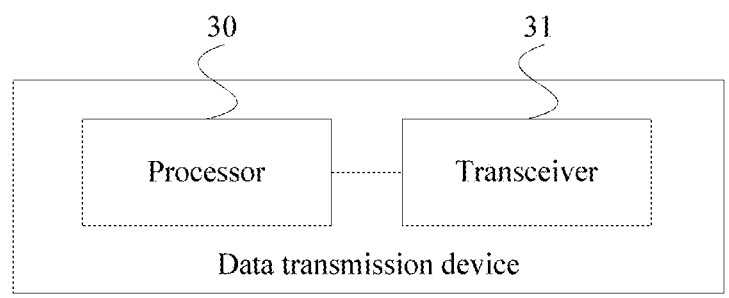
FIG. 4 is a schematic structural diagram of Embodiment 3 of a data transmission device according to the present invention.

FIG. 4 is a schematic structural diagram of Embodiment 3 of a data transmission device according to the present invention. The data transmission device is applicable to a multi-stream data transmission system for line of sight propagation, and the data transmission device may be the first communications equipment in the foregoing method embodiment. The multi-stream data transmission system may include the first communications equipment and second communications equipment. Both the first communications equipment and the second communications equipment include multiple antenna ports. The second communications equipment is mobile communications equipment. Referring to FIG. 4, the data transmission device includes a processor 30 and a transceiver 31.

The processor 30 is configured to obtain a first antenna port corresponding to location information of the second communications equipment. The first antenna port is an antenna port, of the first communications equipment, satisfying a condition for multi-stream data transmission between the first communications equipment and the second communications equipment. The location information of the second communications equipment includes a line of sight transmission distance between the first communications equipment and the second communications equipment and/or information about a relative angle between the first communications equipment and the second communications equipment.

The transceiver 31 is configured to perform multi-stream data transmission with the second communications equipment according to the first antenna port.

In a possible implementation of this embodiment of the present invention, the processor 30 is specifically configured to obtain the location information of the second communications equipment, and obtain the first antenna port according to the location information of the second communications equipment and a mapping relationship between the location information of the second communications equipment and the first antenna port.

Further, that the processor 30 is specifically configured to obtain the location information of the second communications equipment includes: The processor 30 is specifically configured to receive, by using the transceiver 31, the location information of the second communications equipment that is reported by the second communications equipment.

In another possible implementation of this embodiment of the present invention, the transceiver 31 is further configured to receive antenna port information reported by the second communications equipment according to the location information of the second communications equipment. The antenna port information includes a quantity of first antenna ports and/or a sequence number of the first antenna port.

The processor 30 is specifically configured to determine the first antenna port according to the antenna port information obtained by the transceiver 31.

Optionally, if a mapping relationship between the location information of the second communications equipment and the first antenna port is preset on both the first communications equipment and the second communications equipment, or a mapping relationship between the location information of the second communications equipment and the first antenna port is preset on the second communications equipment, the antenna port information is determined by the second communications equipment according to the location information of the second communications equipment and the mapping relationship.

Optionally, that the transceiver 31 is further configured to receive antenna port information reported by the second communications equipment according to the location information of the second communications equipment specifically includes: The transceiver 31 is further configured to send a reference signal to the second communications equipment according to the location information of the second communications equipment, and receive the antenna port information reported by the second communications equipment. The reference signal is used to instruct the second communications equipment to obtain channel state information according to the reference signal and select the first antenna port according to the channel state information.

Optionally, the antenna port information is determined by the second communications equipment according to the location information of the second communications equipment and a distance between second antenna ports of the second communications equipment.

The data transmission device provided in this embodiment of the present invention may implement the following method Embodiment 1 to Embodiment 3. An implementation principle and a technical effect of the data transmission device are similar to those of the following method Embodiment 1 to Embodiment 3. For details, refer to specific processes in the following method Embodiment 1 to Embodiment 3.

Figure 5:
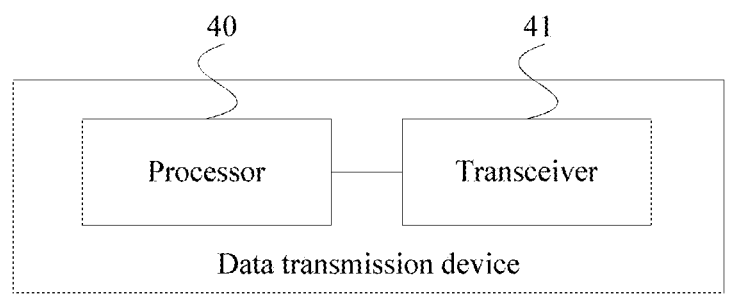
FIG. 5 is a schematic structural diagram of Embodiment 4 of a data transmission device according to the present invention.

FIG. 5 is a schematic structural diagram of Embodiment 4 of a data transmission device according to the present invention. The data transmission device is applicable to a multi-stream data transmission system for line of sight propagation, and the data transmission device may be the second communications equipment in the foregoing method embodiment. The multi-stream data transmission system may include first communications equipment and the second communications equipment. Both the first communications equipment and the second communications equipment include multiple antenna ports. The second communications equipment is mobile communications equipment. Referring to FIG. 5, the data transmission device includes a processor 40 and a transceiver 41.

The processor 40 is configured to select, according to location information of the second communications equipment, a first antenna port corresponding to the location information of the second communications equipment. The first antenna port is an antenna port, of the first communications equipment, satisfying a condition for multi-stream data transmission between the first communications equipment and the second communications equipment. The location information of the second communications equipment includes a line of sight transmission distance between the first communications equipment and the second communications equipment and/or information about a relative angle between the first communications equipment and the second communications equipment.

The transceiver 41 is configured to perform multi-stream transmission with the first communications equipment according to the first antenna port.

In a possible implementation of this embodiment of the present invention, a mapping relationship between the location information of the second communications equipment and the first antenna port is preset on both the first communications equipment and the second communications equipment. The processor 40 is specifically configured to select the first antenna port according to the location information of the second communications equipment and the mapping relationship between the location information of the second communications equipment and the first antenna port.

Further, the transceiver 41 is further configured to report the location information of the second communications equipment to the first communications equipment before the processor 40 selects, according to the location information of the second communications equipment and the mapping relationship between the location information of the second communications equipment and the first antenna port, the first antenna port corresponding to the location information of the second communications equipment, so that the first communications equipment obtains the first antenna port according to the location information of the second communications equipment and the mapping relationship.

In another possible implementation of this embodiment of the present invention, the transceiver 41 is further configured to send antenna port information to the first communications equipment after the processor 40 selects, according to the location information of the second communications equipment and the mapping relationship between the location information of the second communications equipment and the first antenna port, the first antenna port corresponding to the location information of the second communications equipment. The antenna port information includes a quantity of first antenna ports and/or a sequence number of the first antenna port. The antenna port information is used to instruct the first communications equipment to determine the first antenna port.

In a third possible implementation of this embodiment of the present invention, the transceiver 41 is further configured to receive a reference signal delivered by the first communications equipment according to the location information of the second communications equipment.

The processor 40 is specifically configured to determine channel state information according to the reference signal, and select the first antenna port according to the channel state information.

In a fourth possible implementation of this embodiment of the present invention, the processor 40 is specifically configured to: determine a first distance according to the location information of the second communications equipment and a distance between the antenna ports of the second communications equipment; and select, from the antenna ports of the first communications equipment according to the first distance, the first antenna ports satisfying the first distance. The first distance is a distance that antenna ports of the first communications equipment need to satisfy and at which the first communications equipment is able to perform multi-stream transmission with the second communications equipment.

Further, based on the third possible implementation or the fourth possible implementation, the transceiver 41 is further configured to send antenna port information to the first communications equipment after the processor 40 selects, according to the location information of the second communications equipment, the first antenna port corresponding to the location information of the second communications equipment. The antenna port information includes a quantity of first antenna ports and/or a sequence number of the first antenna port. The antenna port information is used to enable the first communications equipment to determine the first antenna port.

The data transmission device provided in this embodiment of the present invention may implement the following method Embodiment 4 to Embodiment 6. An implementation principle and a technical effect of the data transmission device are similar to those of the following method Embodiment 4 to Embodiment 6. For details, refer to specific processes in the following method Embodiment 4 to Embodiment 6.

FIG. 6 is a schematic flowchart of Embodiment 1 of a data transmission method according to the present invention. The method may be executed by the data transmission device shown in FIG. 2 or FIG. 4. The data transmission device is first communications equipment. For a structure thereof, refer to FIG. 2 or FIG. 4. The data transmission device may correspondingly perform the following method steps in this embodiment. This embodiment describes a specific process of performing, by the first communications equipment, multi-stream data transmission with second communications equipment by using a first antenna port that satisfies multi-stream data transmission between the first communications equipment and the second communications equipment and that is obtained by the first communications equipment. As shown in FIG. 6, the method includes the following steps.

S101. The first communications equipment obtains a first antenna port corresponding to location information of the second communications equipment, where the first antenna port is an antenna port, of the first communications equipment, satisfying a condition for multi-stream data transmission between the first communications equipment and the second communications equipment, the location information includes a line of sight transmission distance between the first communications equipment and the second communications equipment and/or information about a relative angle between the first communications equipment and the second communications equipment.

In this embodiment, the first communications equipment may be considered as a transmit end device, and a distance between adjacent antenna ports (transmit antennas), selected for transmission, of the first communications equipment is dt. The second communications equipment may be considered as a receive end device, and a distance between adjacent antenna ports (receive antennas), selected for reception, of the second communications equipment is dr (for dt and dr, refer to FIG. 1). The second communications equipment is mobile user equipment, and therefore, a transmission distance (which may be referred to as D for short) between the second communications equipment and the first communications equipment is not constant. Optionally, when dr is constant, distances dt, between transmit antennas of the first communications equipment, required by second communications equipments that are at different distances D from the first communications equipment are different. When dt is constant, distances dr, between receive antennas of second communications equipments, required by the second communications equipments that are at different transmission distances from the first communications equipment are also different (this is because in a direct path condition, to implement multi-stream transmission, a transmission distance D, a transmit antenna distance dt, and a receive antenna distance dr need to satisfy a constant relationship). In this embodiment of the present invention, descriptions are provided by using an example in which dr is constant, and the first communications equipment obtains the first antenna port for communication between the first communications equipment and the second communications equipments that are at different transmission distances D from the first communications equipment. Optionally, in this embodiment of the present invention, there may be one first antenna port or may be multiple first antenna ports.

Specifically, both the first communications equipment and the second communications equipment include multiple antenna ports. Optionally, the first communications equipment may provide the second communications equipments that are at different transmission distances from the first communications equipment with antenna ports whose antenna distances match the different transmission distances. Optionally, the first communications equipment may group antennas on an antenna panel of the first communications equipment. Distances between antenna ports in different groups are different, and the antenna ports in the different groups may be corresponding to the second communications equipments that are at different transmission distances from the first communications equipment. Optionally, the first communications equipment may alternatively provide an antenna panel including multiple antenna ports only for the second communications equipment, and determine, according to corresponding signaling exchange between the first communications equipment and the second communications equipment, antenna ports satisfying antenna distances corresponding to the second communications equipments that are at different transmission distances from the first communications equipment.

In this embodiment, that the first communications equipment obtains a first antenna port corresponding to location information of the second communications equipment may be: The first communications equipment proactively obtains the first antenna port corresponding to the location information of the second communications equipment. For example, the first communications equipment may proactively obtain the location information of the second communications equipment and then determine the first antenna port according to the location information of the second communications equipment. Alternatively, that the first communications equipment obtains a first antenna port corresponding to location information of the second communications equipment may be: The first communications equipment passively obtains the first antenna port selected by the second communications equipment. For example, after selecting, according to the location information of the second communications equipment from the antenna panel provided by the first communications equipment, the first antenna port satisfying multi-stream data transmission between the first communications equipment and the second communications equipment, the second communications equipment reports the selected first antenna port to the first communications equipment. This embodiment of the present invention imposes no limitation on a manner of obtaining, by the first communications equipment, the first antenna port satisfying multi-stream data transmission between the first communications equipment and the second communications equipment, provided that the manner can ensure that the obtained first antenna port performs multi-stream data transmission with an antenna port of the second communications equipment at a corresponding transmission distance from the first communications equipment.

It should be noted that the location information of the second communications equipment may include the line of sight transmission distance between the first communications equipment and the second communications equipment and/or the information about the angle between the first communications equipment and the second communications equipment. Optionally, the line of sight transmission distance may be a line distance or a horizontal line distance (that is, the transmission distance D) between a center of an antenna panel of the first equipment and a center of an antenna panel of the second equipment, or may be a line distance between an antenna of a smallest height of the first equipment and an antenna of a smallest height of the second equipment. Optionally, in actual application, the information about the angle may include an angle of arrival or an angle of departure between an antenna of the first communications equipment and a corresponding antenna of the second communications equipment, or an included angle between a horizontal direction and a line connecting an antenna of the second communications equipment to a corresponding antenna of the first communications equipment; may include an included angle between an antenna of the second communications equipment and a corresponding antenna of the first communications equipment on an X plane, a Y plane, or a Z plane; or may include a downtilt angle of an antenna of the first equipment or a tilt angle of an antenna of the second equipment. The location information of the second communications equipment may be obtained by the first communications equipment or the second communications equipment by measuring a corresponding reference signal, or may be obtained according to GPS positioning information or the like. This embodiment of the present invention imposes no limitation on a manner of obtaining the location information of the second communications equipment.

S102. The first communications equipment performs multi-stream data transmission with the second communications equipment according to the first antenna port.

Specifically, after the first communications equipment obtains the first antenna port, the first communications equipment may instruct the second communications equipment to enter a direct path multi-stream transmission mode, and perform, according to the first antenna port, multi-stream data transmission with the second communications equipment with the location information, that is, transmit multiple data streams to the second communications equipment by using the first antenna port.

In the prior art, in a direct path scenario, to perform multi-stream data transmission between a transmit end and a receive end, a transmit-end antenna distance, a receive antenna distance, and a transmission distance are made to satisfy a constant relationship generally during setup of a transmit end device and a receive end device (both the transmit end device and the receive end device in the prior art are base station devices in constant locations), so that the transmit end can perform multi-stream transmission with the receive end. However, in the prior art, locations of the transmit end device and the receive end device are constant, and therefore, a distance between antennas of the transmit end device and a distance between antennas of the receive end device are also constant. That is, in the prior art, the distance between the antennas of the transmit end device and the distance between the antennas of the receive end device cannot support multi-stream data transmission with mobile user equipment. However, in this embodiment of the present invention, the first antenna port obtained by the first communications equipment is related to the location information of the mobile second communications equipment. That is, if the second communications equipment moves to a location, an antenna distance, of the first antenna ports, determined by the first communications equipment is an antenna distance satisfied when the first communications equipment performs multi-stream data transmission with the second communications equipment in this location. Therefore, this embodiment of the present invention can support multi-stream data transmission between a base station and mobile user equipment and improve applicability of a multi-stream data transmission system for line of sight propagation.

According to the data transmission method provided in this embodiment of the present invention, first communications equipment obtains a first antenna port corresponding to location information of second communications equipment and performs multi-stream data transmission with the second communications equipment according to the first antenna port. The method provided in this embodiment of the present invention can support multi-stream data transmission between a base station and mobile user equipment and improve applicability of a multi-stream data transmission system for line of sight propagation.

FIG. 7 is a schematic flowchart of Embodiment 2 of a data transmission method according to the present invention. This embodiment describes a specific process of obtaining, by first communications equipment, a first antenna port when a mapping relationship between location information of second communications equipment and the first antenna port is preset on both the first communications equipment and the second communications equipment. Based on the foregoing embodiment, S101 specifically includes the following steps.

S201. The first communications equipment obtains the location information of the second communications equipment.

Optionally, the first communications equipment may proactively obtain the location information of the second communications equipment. That is, the first communications equipment may obtain the location information of the second communications equipment by measuring a corresponding reference signal. For example, the first communications equipment may obtain the location information of the second communications equipment by measuring a signal reception strength, a signal to interference plus noise ratio, or another parameter of the reference signal. Alternatively, the first communications equipment may passively obtain the location information of the second communications equipment. That is, the first communications equipment may receive the location information of the second communications equipment that is reported by the second communications equipment. The second communications equipment may obtain its location information by means of GPS positioning or other location-aware software.

S202. The first communications equipment obtains the first antenna port according to the location information of the second communications equipment and a mapping relationship between the location information of the second communications equipment and the first antenna port.

Specifically, the mapping relationship between the location information of the second communications equipment and the first antenna port is preset on the first communications equipment. Therefore, after obtaining the location information of the second communications equipment, the first communications equipment may determine the first antenna port according to the location information of the second communications equipment and the mapping relationship. Optionally, the first communications equipment may perform matching according to the location information of the second communications equipment and the mapping relationship, and determine a port whose matching degree is greater than a preset threshold as the first antenna port. For example, reference may be made to FIG. 8. In FIG. 8, the first communications equipment provides four types of antenna ports of different antenna distances: eight antenna ports (eight ports), four ports, two ports, and one port for second communications equipments with different location information, and a distance between antenna ports of the eight ports is the smallest. That is, when the second communications equipment is closer to the first communications equipment, it indicates that there is a smaller distance between antenna ports; and when the second communications equipment is farther away from the first communications equipment, it indicates that there is a larger distance between antenna ports. If the second communications equipment is in location A in FIG. 8, the first communications equipment determines, according to the mapping relationship, that the first antenna ports are four ports, and an antenna distance (that is, dt) of the four ports satisfies multi-stream data transmission between the first communications equipment and the second communications equipment. Certainly, in this embodiment, the second communications equipment may alternatively determine the first antenna port according to the preset mapping relationship between the location information of the second communications equipment and the first antenna port. That is, in this embodiment, both the first communications equipment and the second communications equipment may determine the first antenna port according to the location information of the second communications equipment, and therefore, the first antenna port is used for performing multi-stream data transmission.

Optionally, the mapping relationship may be loaded, by using software, into a processor of the first communications equipment during setup of the first communications equipment. Alternatively, the mapping relationship may be sent to the first communications equipment by using another network element (for example, a core network element and a mobility management entity).

Optionally, after the first communications equipment obtains the first antenna port satisfying multi-stream data transmission between the first communications equipment and the second communications equipment, the first communications equipment may instruct the second communications equipment to enter a direct path multi-stream transmission mode, and transmit multi-stream data to the second communications equipment according to the determined first antenna port.

FIG. 9 is a schematic flowchart of Embodiment 3 of a data transmission method according to the present invention. In this embodiment, after determining a first antenna port according to location information of second communications equipment, the second communications equipment reports, to first communications equipment, antenna port information carrying a related parameter of the first antenna port. Based on the foregoing embodiment, S101 specifically includes the following steps.

S301. The first communications equipment receives antenna port information reported by the second communications equipment according to the location information of the second communications equipment, where the antenna port information includes a quantity of first antenna ports and/or a sequence number of the first antenna port.

Specifically, there may be the following three possible implementations of receiving, by the first communications equipment, the antenna port information reported by the second communications equipment according to the location information of the second communications equipment.

In a first possible implementation, if a mapping relationship between the location information of the second communications equipment and the first antenna port is preset on both the first communications equipment and the second communications equipment, or a mapping relationship between the location information of the second communications equipment and the first antenna port is preset on the second communications equipment (that is, there is no preset mapping relationship on the first communications equipment in this case), the antenna port information is determined by the second communications equipment according to the location information of the second communications equipment and the mapping relationship.

Specifically, different from the foregoing embodiment shown in FIG. 7, in this embodiment, after obtaining the location information of the second communications equipment, the second communications equipment determines, according to the mapping relationship between the location information of the second communications equipment and the first antenna port, the first antenna port satisfying multi-stream data transmission between the second communications equipment and the first communications equipment, and adds the quantity of first antenna ports and/or the sequence number of the first antenna port to the antenna port information and sends the antenna port information to the first communications equipment.

In a second possible implementation, the first communications equipment sends a reference signal to the second communications equipment according to the location information of the second communications equipment, where the reference signal is used to instruct the second communications equipment to obtain channel state information according to the reference signal and select the first antenna port according to the channel state information; and the first communications equipment receives the antenna port information reported by the second communications equipment.

Specifically, the first communications equipment may send the reference signal to the second communications equipment according to the location information of the second communications equipment, and reference signals received by second communications equipments in different locations are different. Therefore, channel state information determined by the second communications equipments in the different locations according to the obtained reference signals is also different. The channel state information may be represented by $H_{rt}$, that is, the channel state information is used to represent a status of a channel between a receive end (the second communications equipment) and a transmit end (the first communications equipment). The channel state information further includes a quantity of antenna ports of the receive end (the second communications equipment). Therefore, the second communications equipment may select, according to the status of the channel between the transmit end and the receive end and the quantity of antenna ports of the receive end that are in the channel state information, the first antenna port on an antenna panel provided by the first communications equipment. For example, if there are 32 antenna ports on the first communications equipment, the first communications equipment determines, according to the obtained location information of the second communications equipment, that reference signals are sent to the second communications equipment by using 16 of the 32 antenna ports (there are 16 reference signals, and each antenna port is corresponding to one reference signal). Optionally, the first communications equipment may combine each two of the 32 antenna ports, to obtain 16 antenna port groups, and one antenna port group may be considered as an available antenna port for sending a reference signal. After receiving the 16 reference signals, the second communications equipment demodulates the 16 reference signals to obtain channel state information corresponding to the 16 antenna ports. Then, the second communications equipment selects, according to the channel state information corresponding to the 16 antenna ports, antenna ports satisfying multi-stream transmission between the first communications equipment and the second communications equipment (channel state information obtained through demodulation by second communications equipments with different location information is different). For example, if the second communications equipment supports eight-stream transmission, the second communications equipment selects antenna ports whose rank of channel state information is 8. Alternatively, if a rank of the channel state information corresponding to the 16 antenna ports is less than 8, a corresponding antenna port satisfying multi-stream (a quantity of streams is an actual maximum channel rank)

transmission is selected as the first antenna port from the 16 antenna ports according to the actual maximum channel rank. It should be noted that a quantity of antenna ports, of the first communications equipment, for transmitting a reference signal needs to be greater than or equal to a quantity of first antenna ports selected by the second communications equipment.

For another example, if there are only two antennas on the second communications equipment, the second communications equipment may select two of transmit end antennas of the first communications equipment according to the channel state information, so as to ensure two-stream data transmission. If there are four antennas on the second communications equipment, to support four-stream transmission, the second communications equipment may select four of transmit antennas of the first communications equipment from the first communications equipment according to the channel state information, so as to ensure four-stream direct path transmission. Generally, when the second communications equipment performs selection on the antenna panel provided by the first communications equipment, reference may be made to FIG. 10, and at least two antenna ports are selected in pairs on a diagonal line, in a vertical direction, or in a horizontal direction of the antenna panel. Alternatively, antenna group-based selection manner may be used. Using two-stream data transmission as an example, the first communications equipment may pre-define two antennas as one group. For example, antennas farthest from each other on a diagonal line of the antenna panel are paired into one group, two antennas in a column in a vertical direction of the antenna panel are paired into one group, or antennas in a line in a horizontal direction of the antenna panel are paired into one group. Then, the second communications equipment may select two antenna groups of the first communications equipment from all antenna groups according to the channel state information.

Optionally, the first communications equipment may alternatively send a reference signal to the second communications equipment without being in accordance with the location information of the second communications equipment. That is, the first communications equipment sends reference signals to the second communications equipment by using all antenna ports of the first communications equipment. Then, after receiving these reference signals, the second communications equipment demodulates the reference signals to obtain corresponding channel state information, and selects, according to the channel state information, antenna ports satisfying multi-stream transmission between the first communications equipment and the second communications equipment.

Then, the second communications equipment adds the quantity of selected first antenna ports and/or the sequence number of the first antenna port to the antenna port information and sends the antenna port information to the first communications equipment.

In a third possible implementation, the antenna port information is determined by the second communications equipment according to the location information of the second communications equipment and a distance between second antenna ports of the second communications equipment.

Specifically, in a direct path condition, to implement multi-stream transmission, a transmission distance D, a transmit antenna distance dt, and a receive antenna distance dr need to satisfy a constant relationship. Therefore, the second communications equipment may determine, according to a line of sight propagation distance (that is, the transmission distance D) and information about an angle that are in the location information of the second communications equipment and a known distance dr between antenna ports of the second communications equipment, an antenna distance dt that needs to be satisfied by antenna ports satisfying multi-stream data transmission between the first communications equipment and the second communications equipment. Then, the second communications equipment may select first antenna ports satisfying dt on the antenna panel provided by the first communications equipment.

S302. The first communications equipment determines the first antenna port according to the antenna port information.

Optionally, after the first communications equipment determines, according to the antenna port information reported by the second communications equipment, the first antenna port satisfying multi-stream data transmission between the first communications equipment and the second communications equipment, the first communications equipment may instruct the second communications equipment to enter a direct path multi-stream transmission mode, and transmit multi-stream data to the second communications equipment according to the determined first antenna port.

According to the data transmission method provided in this embodiment of the present invention, first communications equipment obtains a first antenna port selected by the second communications equipment according to location information of the second communications equipment and performs multi-stream data transmission with the second communications equipment according to the first antenna port. The method provided in this embodiment of the present invention can support multi-stream data transmission between a base station and mobile user equipment and improve applicability of a multi-stream data transmission system for line of sight propagation.

FIG. 11 is a schematic flowchart of Embodiment 4 of a data transmission method according to the present invention. The method may be executed by the data transmission device shown in FIG. 3 or FIG. 5. The data transmission device is second communications equipment. For a structure thereof, refer to FIG. 3 or FIG. 5. The data transmission device may perform the following method steps in this embodiment. This embodiment describes a specific process of selecting, by the second communications equipment, a first antenna port according to location information of the second communications equipment, and performing multi-stream data transmission with the second communications equipment according to the first antenna port. As shown in FIG. 11, the method includes the following steps.

S401. The second communications equipment selects, according to location information of the second communications equipment, a first antenna port corresponding to the location information of the second communications equipment, where the first antenna port is an antenna port, of the first communications equipment, satisfying a condition for multi-stream data transmission between the first communications equipment and the second communications equipment, and the location information of the second communications equipment includes a line of sight transmission distance between the first communications equipment and the second communications equipment and/or information about a relative angle between the first communications equipment and the second communications equipment.

In this embodiment, the first communications equipment may be considered as a transmit end device, and a distance between adjacent antenna ports (transmit antennas), selected for transmission, of the first communications equipment is dt. The second communications equipment may be considered as a receive end device, and a distance between adjacent antenna ports (receive antennas), selected for reception, of the second communications equipment is dr (which may be shown in FIG. 1). The second communications equipment is mobile user equipment, and therefore, a transmission distance (which may be referred to as D for short) between the second communications equipment and the first communications equipment is not constant. Optionally, when dr is constant, distances dt, between transmit antennas of the first communications equipment, required by second communications equipments that are at different distances D from the first communications equipment are different. When dt is constant, distances dr, between receive antennas of second communications equipments, required by the second communications equipments that are at different transmission distances from the first communications equipment are also different (this is because in a direct path condition, to implement multi-stream transmission, a transmission distance D, a transmit antenna distance dt, and a receive antenna distance dr need to satisfy a constant relationship). In this embodiment of the present invention, descriptions are provided by using an example in which dr is constant, and the first communications equipment obtains the first antenna port for communication between the first communications equipment and the second communications equipments that are at different transmission distances D from the first communications equipment. Optionally, in this embodiment of the present invention, there may be one first antenna port or may be multiple first antenna ports.

Specifically, both the first communications equipment and the second communications equipment include multiple antenna ports. Optionally, the first communications equipment may provide the second communications equipments that are at different transmission distances from the first communications equipment with antenna ports whose antenna distances match the different transmission distances. Therefore, after determining the location information of the second communications equipment, the second communications equipment may select, from the first communications equipment, the first antenna port satisfying multi-stream data transmission between the first communications equipment and the second communications equipment. Optionally, the first communications equipment may alternatively group antennas on an antenna panel of the first communications equipment. Distances between antenna ports in different groups are different, and the antenna ports in the different groups may be corresponding to the second communications equipments that are at different transmission distances from the first communications equipment. Therefore, after determining the location information of the second communications equipment, the second communications equipment may select, from antenna groups provided by the first communications equipment according to the location information, an antenna group satisfying multi-stream data transmission between the first communications equipment and the second communications equipment as first antenna ports. Optionally, the first communications equipment may alternatively provide an antenna panel including multiple antenna ports only for the second communications equipment, and determine, according to signaling exchange between the first communications equipment and the second communications equipment, antenna ports satisfying antenna distances corresponding to the second communications equipments that are at different transmission distances from the first communications equipment.

It should be noted that the location information of the second communications equipment may include the line of sight transmission distance (that is, the transmission distance D) between the first communications equipment and the second communications equipment and/or the information about the angle between the first communications equipment and the second communications equipment. Optionally, the line of sight transmission distance may be a line distance or a horizontal line distance (that is, the transmission distance D) between a center of an antenna panel of the first equipment and a center of an antenna panel of the second equipment, or may be a line distance between an antenna of a smallest height of the first equipment and an antenna of a smallest height of the second equipment. Optionally, in actual application, the information about the angle may include an angle of arrival or an angle of departure between an antenna of the first communications equipment and a corresponding antenna of the second communications equipment, or an included angle between a horizontal direction and a line connecting an antenna of the second communications equipment to a corresponding antenna of the first communications equipment; may include an included angle between an antenna of the second communications equipment and a corresponding antenna of the first communications equipment on an X plane, a Y plane, or a Z plane; or may include a downtilt angle of an antenna of the first equipment or a tilt angle of an antenna of the second equipment. The location information of the second communications equipment may be obtained by the first communications equipment or the second communications equipment by measuring a corresponding reference signal, or may be obtained according to GPS positioning information or the like. This embodiment of the present invention imposes no limitation on a manner of obtaining the location information of the second communications equipment.

S402. The second communications equipment performs multi-stream transmission with the first communications equipment according to the first antenna port.

In this embodiment of the present invention, the first antenna port, of the first communications equipment, obtained by the second communications equipment is related to the location information of the mobile second communications equipment. That is, if the second communications equipment moves to a location, an antenna distance, of the first antenna ports, determined by the second communications equipment is an antenna distance satisfied when the first communications equipment performs multi-stream data transmission with the second communications equipment in this location. Therefore, this embodiment of the present invention can support multi-stream data transmission between a base station and mobile user equipment and improve applicability of a multi-stream data transmission system for line of sight propagation.

According to the data transmission method provided in this embodiment of the present invention, second communications equipment selects a first antenna port from first communications equipment according to location information of the second communications equipment, and performs multi-stream data transmission with the first communications equipment according to the first antenna port. The method provided in this embodiment of the present invention can support multi-stream data transmission between a base station and mobile user equipment and improve applicability of a multi-stream data transmission system for line of sight propagation.

In a possible implementation of this embodiment of the present invention, an embodiment describes a specific process of obtaining, by second communications equipment, a first antenna port when a mapping relationship between location information of the second communications equipment and first antenna port is preset on both the first communications equipment and the second communications equipment. Based on the foregoing embodiment shown in FIG. 11, S401 specifically includes: The second communications equipment selects the first antenna port according to the location information of the second communications equipment and a mapping relationship between the location information of the second communications equipment and the first antenna port.

Specifically, the mapping relationship between the location information of the second communications equipment and the first antenna port is preset on the second communications equipment, and therefore, the second communications equipment may determine, according to the determined location information of the second communications equipment, the first antenna port satisfying multi-stream data transmission between the second communications equipment and the first communications equipment. At the same time, the first communications equipment may also determine, according to the location information of the second communications equipment and the mapping relationship, the first antenna port selected by the second communications equipment, so that the second communications equipment with the location information may perform multi-stream data transmission with the first communications equipment according to the first antenna port.

That the first communications equipment determines, according to the location information of the second communications equipment and the mapping relationship, the first antenna port selected by the second communications equipment may be specifically as follows:

Optionally, the first communications equipment may proactively obtain the location information of the second communications equipment. That is, the first communications equipment may obtain the location information of the second communications equipment by measuring a corresponding reference signal. For example, the first communications equipment may obtain the location information of the second communications equipment by measuring a signal reception strength, a signal to interference plus noise ratio, or another parameter of the reference signal, and then obtain the first antenna port according to the location information of the second communications equipment and the mapping relationship.

Optionally, the first communications equipment may alternatively passively obtain the location information of the second communications equipment. That is, before S401, the second communications equipment may report the location information of the second communications equipment to the first communications equipment, so that the first communications equipment obtains the first antenna port according to the location information of the second communications equipment and the mapping relationship. Reference may be made to the foregoing example in FIG. 8, and details are not repeated herein in this embodiment.

Optionally, the first communications equipment may alternatively directly obtain the first antenna port selected by the second communications equipment. That is, after S401, the second communications equipment may further send antenna port information to the first communications equipment. The antenna port information includes a quantity of first antenna ports and/or a sequence number of the first antenna port. The antenna port information is used to instruct the first communications equipment to determine the first antenna port, and therefore, the first communications equipment may learn, according to the antenna port information, the first antenna port selected by the second communications equipment. In this case, the mapping relationship between the location information of the second communications equipment and the first antenna port may be preset on the first communications equipment, or the mapping relationship between the location information of the second communications equipment and the first antenna port may not be preset on the first communications equipment.

Optionally, the mapping relationship may be loaded, by using software, into a processor of the first communications equipment in advance. Alternatively, the mapping relationship may be sent to the second communications equipment by using another network element (for example, a core network element and a mobility management entity).

Figure 12:
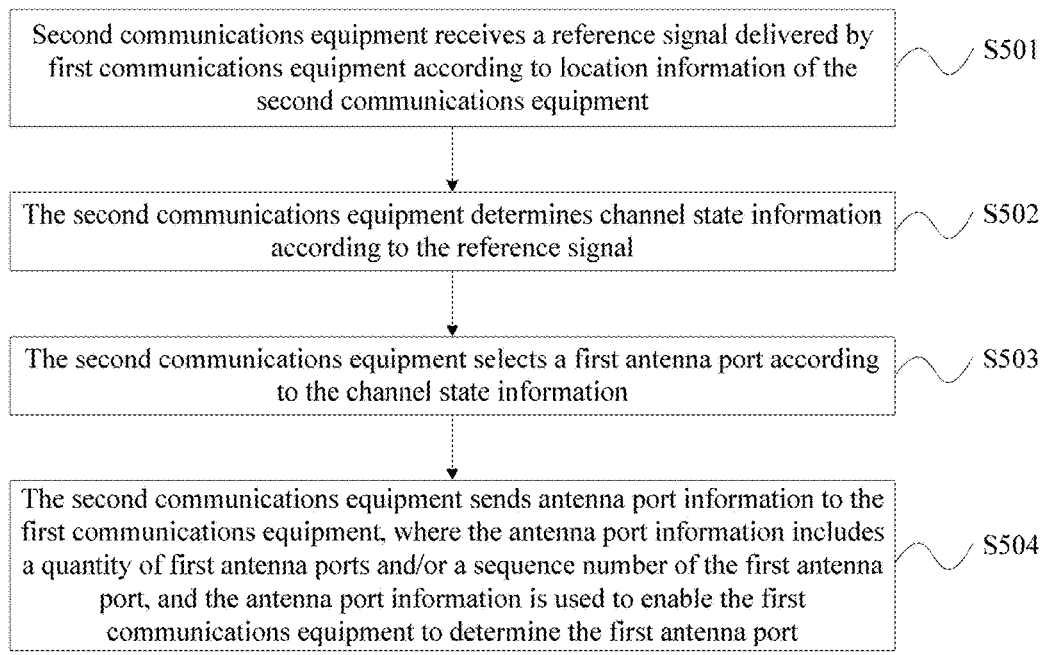
FIG. 12 is a schematic flowchart of Embodiment 5 of a data transmission method according to the present invention.

FIG. 12 is a schematic flowchart of Embodiment 5 of a data transmission method according to the present invention. This embodiment describes another specific process of determining, by second communications equipment, a first antenna port according to location information of the second communications equipment. Based on the foregoing embodiment shown in FIG. 11, S401 specifically includes the following steps.

S501. The second communications equipment receives a reference signal delivered by the first communications equipment according to the location information of the second communications equipment.

S502. The second communications equipment determines channel state information according to the reference signal.

Specifically, the first communications equipment may send the reference signal to the second communications equipment according to the location information of the second communications equipment, and reference signals received by second communications equipments in different locations are different. Therefore, channel state information determined by the second communications equipments in the different locations according to the obtained reference signals is also different.

S503. The second communications equipment selects the first antenna port according to the channel state information.

Specifically, the channel state information may be represented by $H_{rt}$, that is, the channel state information is used to represent a status of a channel between a receive end (the second communications equipment) and a transmit end (the first communications equipment). The channel state information further includes a quantity of antenna ports of the receive end (the second communications equipment). Therefore, the second communications equipment may select, according to the status of the channel between the transmit end and the receive end and the quantity of antenna ports of the receive end that are in the channel state information, the first antenna port on an antenna panel provided by the first communications equipment. For example, if there are 32 antenna ports on the first communications equipment, the first communications equipment determines, according to the obtained location information of the second communications equipment, that reference signals are sent to the second communications equipment by using 16 of the 32 antenna ports (there are 16 reference signals, and each antenna port is corresponding to one reference signal). Optionally, the first communications equipment may combine each two of the 32 antenna ports, to obtain 16 antenna port groups, and one antenna port group may be considered as an available antenna port for sending a reference signal. After receiving the 16 reference signals, the second communications equipment demodulates the 16 reference signals to obtain channel state information corresponding to the 16 antenna ports. Then, the second communications equipment selects, according to the channel state information corresponding to the 16 antenna ports, antenna ports satisfying multi-stream transmission between the first communications equipment and the second communications equipment. For example, if the second communications equipment supports eight-stream transmission, the second communications equipment selects antenna ports whose rank of channel state information is 8. Alternatively, if a rank of the channel state information corresponding to the 16 antenna ports is less than 8, a corresponding antenna port satisfying multi-stream (a quantity of streams is an actual maximum channel rank) transmission is selected as the first antenna port from the 16 antenna ports according to the actual maximum channel rank. It should be noted that a quantity of antenna ports, of the first communications equipment, for transmitting a reference signal needs to be greater than or equal to a quantity of first antenna ports selected by the second communications equipment.

For another example, if there are only two antennas on the second communications equipment, the second communications equipment may select two of transmit end antennas of the first communications equipment according to the channel state information, so as to ensure two-stream data transmission. If there are four antennas on the second communications equipment, to support four-stream transmission, the second communications equipment may select four of transmit antennas from the first communications equipment according to the channel state information, so as to ensure four-stream direct path transmission. Generally, when the second communications equipment performs selection on the antenna panel provided by the first communications equipment, reference may be made to FIG. 10, and at least two antenna ports are selected in pairs on a diagonal line, in a vertical direction, or in a horizontal direction of the antenna panel. Alternatively, antenna group-based selection manner may be used. Using two-stream data transmission as an example, the first communications equipment may pre-define two antennas as one group. For example, antennas farthest from each other on a diagonal line of the antenna panel are paired into one group, two antennas in a column in a vertical direction of the antenna panel are paired into one group, or antennas in a line in a horizontal direction of the antenna panel are paired into one group. Then, the second communications equipment may select two antenna groups of the first communications equipment from all antenna groups according to the channel state information.

Optionally, the first communications equipment may alternatively send a reference signal to the second communications equipment without being in accordance with the location information of the second communications equipment. That is, the first communications equipment sends reference signals to the second communications equipment by using all antenna ports of the first communications equipment. Then, after receiving these reference signals, the second communications equipment demodulates the reference signals to obtain corresponding channel state information, and selects, according to the channel state information, antenna ports satisfying multi-stream transmission between the first communications equipment and the second communications equipment.

S504. The second communications equipment sends antenna port information to the first communications equipment, where the antenna port information includes a quantity of first antenna ports and/or a sequence number of the first antenna port, and the antenna port information is used to enable the first communications equipment to determine the first antenna port.

Optionally, after determining, according to the antenna port information reported by the second communications equipment, the first antenna port satisfying multi-stream data transmission between the first communications equipment and the second communications equipment, the first communications equipment may instruct the second communications equipment to enter a direct path multi-stream transmission mode, and transmit multi-stream data to the second communications equipment according to the determined first antenna port.

Figure 13:
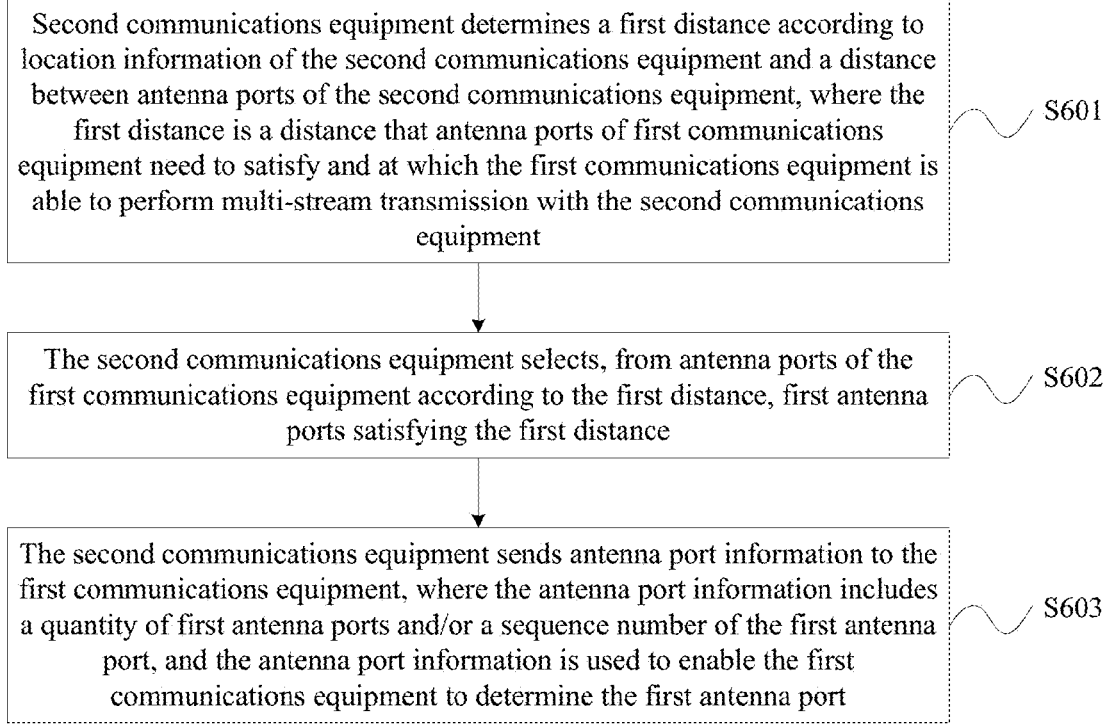
FIG. 13 is a schematic flowchart of Embodiment 6 of a data transmission method according to the present invention.

FIG. 13 is a schematic flowchart of Embodiment 6 of a data transmission method according to the present invention. This embodiment describes another specific process of determining, by second communications equipment, a first antenna port according to location information of the second communications equipment. Based on the foregoing embodiment shown in FIG. 11, S401 specifically includes the following steps.

S601. The second communications equipment determines a first distance according to the location information of the second communications equipment and a distance between antenna ports of the second communications equipment, where the first distance is a distance that antenna ports of the first communications equipment need to satisfy and at which the first communications equipment is able to perform multi-stream transmission with the second communications equipment.

Specifically, in a direct path condition, to implement multi-stream transmission, a transmission distance D, a transmit antenna distance dt, and a receive antenna distance dr need to satisfy a constant relationship. Therefore, the second communications equipment may determine the first distance dt according to a line of sight propagation distance (that is, the transmission distance D) and information about an angle that are in the location information of the second communications equipment and a known distance dr between antenna ports of the second communications equipment. The first distance is a distance that antenna ports of the first communications equipment need to satisfy and at which the first communications equipment is able to perform multi-stream transmission with the second communications equipment.

S602. The second communications equipment selects, from antenna ports of the first communications equipment according to the first distance, the first antenna ports satisfying the first distance.

S603. The second communications equipment sends antenna port information to the first communications equipment, where the antenna port information includes a quantity of first antenna ports and/or a sequence number of the first antenna port, and the antenna port information is used to enable the first communications equipment to determine the first antenna port.

Specifically, the first communications equipment may determine, from the antenna ports (or an antenna panel) of the first communications equipment according to the antenna port information reported by the second communications equipment, the first antenna port satisfying multi-stream data transmission between the first communications equipment and the second communications equipment. Optionally, after determining the first antenna port satisfying multi-stream data transmission between the first communications equipment and the second communications equipment, the first communications equipment may instruct the second communications equipment to enter a direct path multi-stream transmission mode, and transmit multi-stream data to the second communications equipment according to the determined first antenna port.

According to the data transmission method provided in this embodiment of the present invention, second communications equipment selects a first antenna port from first communications equipment according to location information of the second communications equipment and performs multi-stream data transmission with the first communications equipment according to the first antenna port. The method provided in this embodiment of the present invention can support multi-stream data transmission between a base station and mobile user equipment and improve applicability of a multi-stream data transmission system for line of sight propagation.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A data transmission device comprising:
   a processor;
   a memory storing a program to be executed by the processor, the program comprising instructions for:
      obtaining a first antenna port corresponding to location information of a second communications equipment, wherein the first antenna port is an antenna port of a first communications equipment, wherein the location information of the second communications equipment comprises a line of sight transmission distance between the first communications equipment and the second communications equipment, and wherein the data transmission device is the first communications equipment and the second communications equipment is a mobile communications equipment; and
      determining whether the first antenna port satisfies a condition for multi-stream data transmission between the first communications equipment and the second communications equipment based on the line of sight transmission distance and based on a second distance between a pair of antenna ports of the second communications equipment; and
   a transceiver configured to perform multi-stream data transmission with the second communications equipment according to the first antenna port, and to receive antenna port information reported by the second communications equipment according to the location information of the second communications equipment, wherein the antenna port information comprises a sequence number of the first antenna port, and wherein the program further comprises instructions for determining the first antenna port according to the antenna port information obtained by the transceiver.

2. The data transmission device according to claim 1, wherein the program further comprises instructions for:
   obtaining the location information of the second communications equipment, and
   obtaining the first antenna port according to the location information of the second communications equipment and a mapping relationship between the location information of the second communications equipment and the first antenna port.

3. The data transmission device according to claim 2, wherein the instructions for obtaining the location information of the second communications equipment comprises instructions for receiving, by using the transceiver, the location information of the second communications equipment that is reported by the second communications equipment.

4. The data transmission device according to claim 1, wherein:
   the antenna port information further comprises—a quantity of first antenna ports; and
   the program further comprises instructions for determining the first antenna port according to the quantity of first antenna ports comprised by the antenna port information.

5. The data transmission device according to claim 1, wherein:
   a mapping relationship between the location information of the second communications equipment and the first antenna port is preset on both the first communications equipment and the second communications equipment, or a mapping relationship between the location information of the second communications equipment and the first antenna port is preset on the second communications equipment; and
   the antenna port information is determined by the second communications equipment according to the location information of the second communications equipment and the mapping relationship.

6. The data transmission device according to claim 1, wherein the transceiver is configured to receive antenna port information by being configured to:
   send a reference signal to the second communications equipment according to the location information of the second communications equipment; and
   receive the antenna port information reported by the second communications equipment, wherein the reference signal is used to instruct the second communications equipment to obtain channel state information according to the reference signal and select the first antenna port according to the channel state information.

7. The data transmission device according to claim 1, wherein the antenna port information is determined by the second communications equipment according to the location information of the second communications equipment and a distance between second antenna ports of the second communications equipment.

8. A data transmission device comprising:
   a processor;
   a memory storing a program to be executed by the processor, the program comprising instructions for selecting a first antenna port corresponding to a location information of a second communications equipment, wherein:

the first antenna port is an antenna port, of a first communications equipment;

the first antenna port satisfies a condition for multi-stream data transmission between the first communications equipment and the second communications equipment;

the location information of the second communications equipment comprises a line of sight transmission distance between the first communications equipment and the second communications equipment;

the condition for multi-stream data transmission is based on the line of sight transmission distance between the first communications equipment and the second communications equipment and is further based on a second distance between a pair of antenna ports of the first communications equipment; and the data transmission device is the second communications equipment, and the first communications equipment is a mobile communications equipment; and a transceiver configured to perform simultaneous transmission of multiple streams using a same time-frequency resource with the first communications equipment according to the first antenna port, and to send antenna port information to the first communications equipment after the instructions cause the processor to select the first antenna port, wherein the antenna port information comprises a sequence number of the first antenna port, and wherein the antenna port information instructs the first communications equipment to determine the first antenna port.

9. The data transmission device according to claim 8, wherein:

a mapping relationship between the location information of the second communications equipment and the first antenna port is preset on both the first communications equipment and the second communications equipment; and the program further comprises instructions for selecting the first antenna port according to the location information of the second communications equipment and the mapping relationship between the location information of the second communications equipment and the first antenna port.

10. The data transmission device according to claim 9, wherein the transceiver is further configured to report the location information of the second communications equipment to the first communications equipment before the instructions cause the processor to select the first antenna port, causing the first communications equipment to obtain the first antenna port according to the location information of the second communications equipment and the mapping relationship.

11. The data transmission device according to claim 8, wherein:

the antenna port information further comprises a quantity of first antenna ports.

12. The data transmission device according to claim 8, wherein:

the transceiver is further configured to receive a reference signal delivered by the first communications equipment according to the location information of the second communications equipment; and the program further comprises instructions for determining channel state information according to the reference signal, and selecting the first antenna port according to the channel state information.

13. The data transmission device according to claim 12, wherein:

the transceiver is further configured to send antenna port information to the first communications equipment after the instructions cause the processor to select the first antenna port;

the antenna port information comprises a quantity of first antenna ports or a sequence number of the first antenna port; and the antenna port information is used to enable the first communications equipment to determine the first antenna port.

14. The data transmission device according to claim 8, wherein the program further comprises instructions for:

determining a first distance according to the location information of the second communications equipment and a distance between second antenna ports of the second communications equipment; and selecting, from first antenna ports of the first communications equipment according to the first distance, the first antenna ports satisfying the first distance, wherein the first distance is a distance that antenna ports of the first communications equipment satisfy and at which the first communications equipment is able to perform multi-stream transmission with the second communications equipment.

15. A data transmission method comprising:

selecting, by a second communications equipment, a first antenna port from among a first plurality of antenna ports and corresponding to location information of the second communications equipment, wherein:

the first antenna port is an antenna port, of a first communications equipment, satisfying a condition for multi-stream data transmission between the first communications equipment and the second communications equipment;

the location information of the second communications equipment comprises a line of sight transmission distance between the first communications equipment and the second communications equipment; and the second communications equipment is a mobile communications equipment;

sending, after the selecting, by the second communications equipment, antenna port information to the first communications equipment, wherein the antenna port information comprises a sequence number of the first antenna port, and the antenna port information instructs the first communications equipment to determine the first antenna port; and performing, by the second communications equipment, multi-stream transmission with the first communications equipment according to the first antenna port.

16. The method according to claim 15, wherein:

a mapping relationship between the location information of the second communications equipment and the first antenna port is preset on both the first communications equipment and the second communications equipment; and the selecting comprises selecting, by the second communications equipment, the first antenna port from among the first plurality of antenna ports and according to the location information of the second communications equipment and the mapping relationship between the location information of the second communications equipment and the first antenna port.

17. The method according to claim 16, further comprising before the selecting, reporting, by the second communications equipment, the location information of the second communications equipment to the first communications equipment, causing the first communications equipment to obtain the first antenna port according to the location information of the second communications equipment and the mapping relationship.

18. The method according to claim 15, wherein the antenna port information further comprises a quantity of first antenna ports.

19. The method according to claim 15, wherein the selecting comprises:
- receiving, by the second communications equipment, a reference signal delivered by the first communications equipment according to the location information of the second communications equipment;
- determining, by the second communications equipment, channel state information according to the reference signal; and
- selecting, by the second communications equipment, the first antenna port according to the channel state information.

20. The method according to claim 15, wherein the selecting comprises:
- determining, by the second communications equipment, a first distance according to the location information of the second communications equipment and a distance between second antenna ports of the second communications equipment, wherein the first distance is a distance that antenna ports of the first communications equipment need to satisfy and at which the first communications equipment is able to perform multi-stream transmission with the second communications equipment; and
- selecting, by the second communications equipment, first antenna ports from the antenna ports of the first communications equipment according to the first distance, the first antenna ports satisfying the first distance.

* * * * *